July 5, 1960 R. I. NAGEL 2,943,530
OPTICAL INDICATOR FOR LIQUID LEVEL
Filed Oct. 26, 1956 2 Sheets-Sheet 1
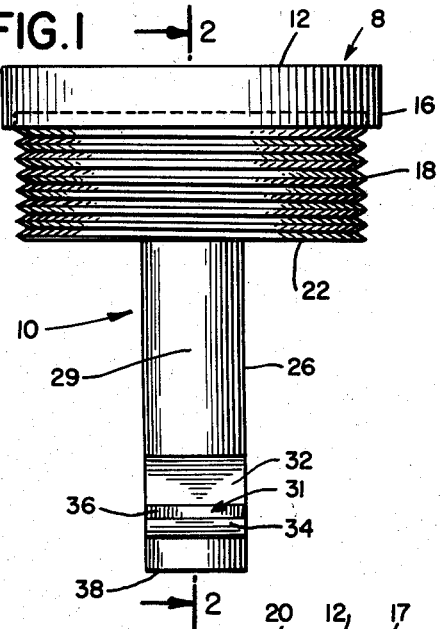
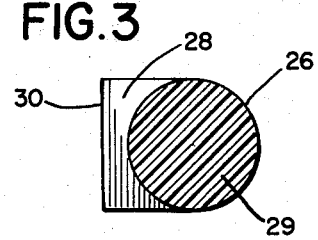
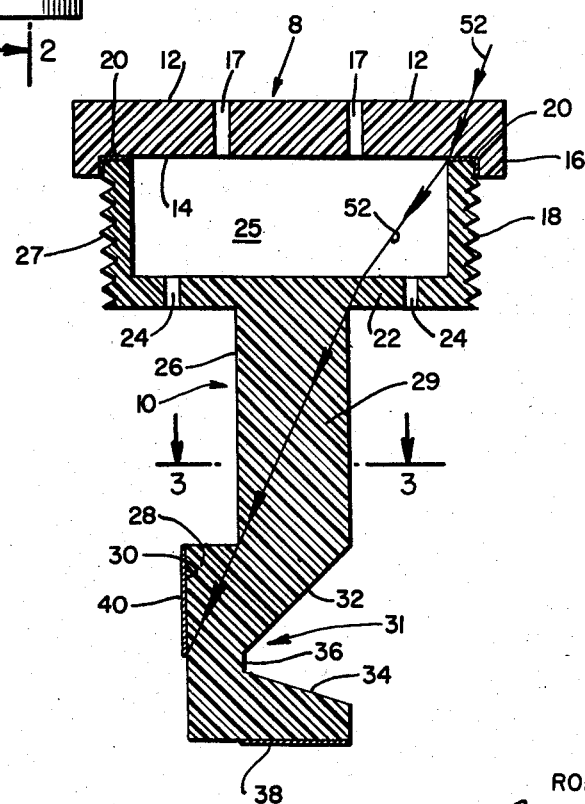
INVENTOR
ROBERT I. NAGEL
*Richard A. Craig*
ATTORNEY July 5, 1960
R. I. NAGEL
2,943,530
OPTICAL INDICATOR FOR LIQUID LEVEL
Filed Oct. 26, 1956
2 Sheets-Sheet 2
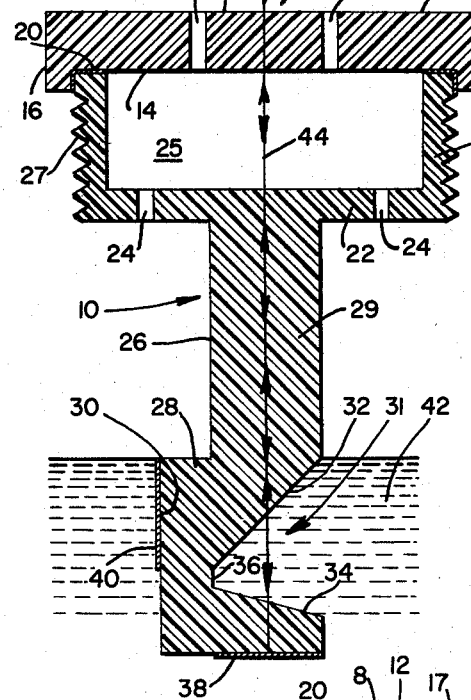
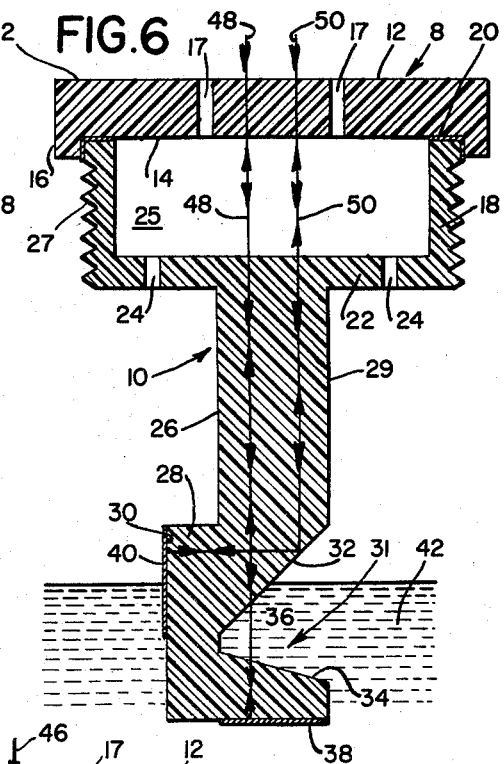
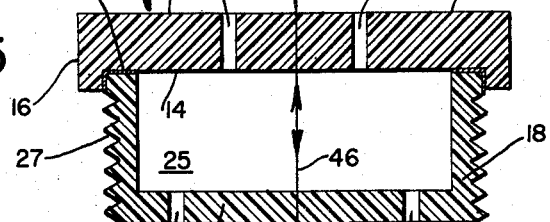
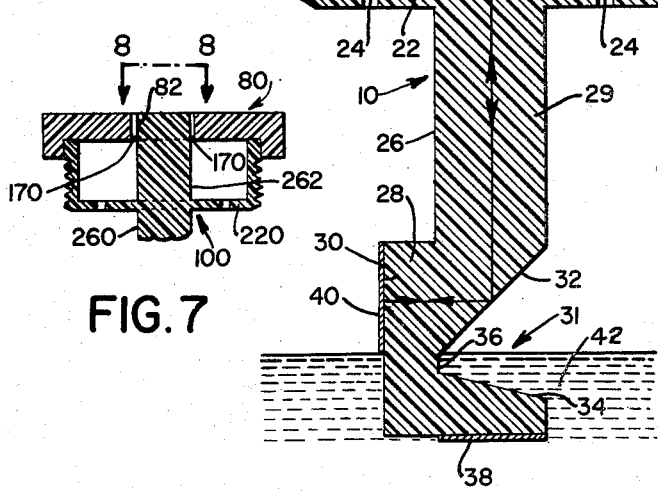
INVENTOR
ROBERT I. NAGEL
Richard A. Craig
ATTORNEY

United States Patent Office 2,943,530
Patented July 5, 1960

2,943,530

OPTICAL INDICATOR FOR LIQUID LEVEL

Robert I. Nagel, Skokie, Ill., assignor to Elastic Stop Nut Corporation of America, Union, N.J., a corporation of New Jersey Filed Oct. 26, 1956, Ser. No. 618,629

3 Claims. (Cl. 88—1)

This invention relates to devices for giving predetermined optical stimuli as a function of liquid level with respect to the device.

The invention will be described hereinafter by way of example as embodied in a battery cap which provides a visible indication as to whether the electrolyte level is high enough, at a critical point or too low without removing the battery cap from the battery. The level can be checked simply by looking down at the top of the cap.

Among the important objects of the invention is that of providing a liquid level indicator which will enable the liquid level to be checked without removing the indicator from the liquid container.

Other objects and advantages will appear hereinafter in connection with the description of a preferred form of battery cap embodying the invention and the accompanying drawings thereof in which:

Fig. 1 is an elevation of a battery cap in accordance with the invention;

Fig. 2 is a sectional view taken on line 2—2 of Fig. 1;

Fig. 3 is a sectional view taken on line 3—3 of Fig. 2;

Fig. 4 is a view similar to Fig. 2 but showing battery electrolyte at the lowest safe level;

Fig. 5 is a view similar to Fig. 4 but showing the electrolyte at the highest unsafe level;

Fig. 6 is a view similar to Fig. 4 but showing the electrolyte at a critical level;

Fig. 7 is a fragmentary view similar to Fig. 2 showing a modified form of battery cap; and Fig. 8 is a view on line 8—8 of Fig. 7.

The illustrated battery cap comprises a top portion 8 and a post portion 10 of suitable transparent material which will not be adversely affected by the liquid with which the device is to be used. Polystyrene is an example of a suitable material for use with battery electrolyte.

Top portion 8 is circular and has top and bottom parallel faces 12 and 14, respectively. An annular skirt 16 depends from face 14. As shown, top portion 8 has vents in the form of holes 17 connecting faces 12 and 14.

Post portion 10 at its upper end has an annular flange 18 of outside diameter adapted to fit within skirt 16. The upper end of flange 18 is within skirt 16, and portions 8 and 10 are fastened together as by cement as indicated at 20. The lower end of flange 18 is closed by a floor 22, except for vents in the form of holes 24 therethrough. Thus face 14, the inner wall of flange 18 and the top of floor 22 define a chamber 25. Except for the part of flange 18 which is inside of skirt 16, flange 18 is provided with an external thread 27 for screw threaded engagement with a usual hole in the top of a battery (not shown).

Perpendicularly depending from the center of floor 22 is a post 26 having a cylindrical portion 29 adjacent floor 22. The diameter of portion 29 is considerably smaller than that of flange 18.

One side of post 26 at the end of cylindrical portion 29 remote from floor 22 has a lateral extension 28 terminating at a plane surface 30 parallel to the axis of portion 29 and of a width as shown in Fig. 3 equal to the diameter of portion 29 and symmetrical with respect to a plane including the axis. This is clearly shown in Figs. 2 (for example) and 3.

On the side of post 26 directly opposite extension 28, is a notch 31 the lateral depth of which is as shown equal to the diameter of post portion 29, notch 31 being defined by an upper plane highly polished surface 32, a lower plane surface 34 and a plane surface 36 joining surfaces 32 and 34.

Surface 32 makes an angle of 45 degrees with the axis of post portion 29 and also with surface 30 and faces in the general direction away from floor 22.

Surface 34 is further from floor 22 than is surface 32 and makes a slight angle, for example 5 to 10 degrees, with a plane normal to the axis of post 26 and an angle slightly greater than 45 degrees with surface 32. The inclination of surface 34 is exaggerated in the drawings for clarity.

Surface 36 is parallel to surface 30 and to the axis of post portion 29.

The end of post 26 remote from floor 22 is perpendicular to the axis of post 26 and is colored green at 38. Surface 30 is colored red directly opposite surface 32, as indicated at 40. The colors are applied in any suitable manner, as by hot stamping.

The operation of the device will now be explained by particular reference to Figs. 4, 5 and 6. It will be assumed that the battery cap is installed in a battery in the usual manner as described above. For simplicity the battery is not illustrated, but the electrolyte is shown at 42.

In Fig. 4 electrolyte 42 is shown at a level which has been predetermined to be the minimum safe level. The battery cap is dimensioned so that the top of extension 28 and the top of surface 32 are at the minimum safe level. Under these circumstances there is optical contact between electrolyte 42 and surface 32, and light entering the battery cap through cover 8 will pass down post portion 29 in a first light path. This light will then follow a continuation of the first path, the continuation path extending through the interface between electrolyte 42 and surface 32, through that part of electrolyte 42 in notch 31, through surface 34 and thence to green signal 38. This light is then reflected by green signal 38 and retraces its paths, all as indicated by line 44. Thus to an observer looking down at the battery cap, post portion 29 will appear entirely green, indicating a safe level of electrolyte 42.

In Fig. 5 electrolyte 42 is shown at the highest unsafe level, coinciding with the bottom of red area 40 and the bottom of surface 32. Under these circumstances there is no optical contact between electrolyte 42 and surface 32, and light entering the battery cap will again pass down post portion 29 in the first path. The light will then be totally internally reflected at surface 32 in a second light path extending from surface 32 to red signal 40. This light is then reflected by red signal 40 and retraces its paths, all as indicated by line 46. Thus to the observer, post portion 29 will appear entirely red, indicating an unsafe level of electrolyte 42.

In Fig. 6 electrolyte 42 is shown at a critical level, at which part of red signal 40 and part of surface 32 are immersed. Under these circumstances a first part of the light entering the first path will act the same as all of the light under the conditions of Fig. 4 and the balance will act the same as all of the light under the conditions of Fig. 5. The first part of the light will follow and retrace the first and continuation paths as indicated by line 48, and the balance will follow and retrace the first and second paths as indicated by line 50. Thus to the observer, post portion 29 will appear partly green (corresponding to line 48) and partly red (corresponding to line 50).

Surface 34 has no optical properties and is sloped as aforesaid to permit electrolyte run-off. To assure this run-off it is desirable not to have an acute intersection between surfaces 32 and 34 where residual electrolyte could be held in optical contact with surface 32 when in reality the level of electrolyte 42 might be too low. This could give rise to a false split signal of the type described above in connection with Fig. 6. The possibility that this could happen is obviated by the presence of surface 36 which serves to separate surfaces 32 and 34 and assure electrolyte run-off from surface 34.

An operative device could be made without extension 28, in which case the red signal would be applied to the cylindrical surface of post portion 29, which would be more difficult than applying it to flat surface 30. This would also result of necessity in a reduction in the lateral depth of notch 31 and therefore also in a signal area less than the diameter of post portion 29. Most important, however, without extension 28 it would be possible to get a direct sight on the red signal, no matter what the electrolyte level might be. Thus, if relevant dimensions are properly chosen, extension 28 makes it possible to prevent red signal 40 from being seen directly from the most extreme viewing angle, the line of sight for this viewing angle being shown at 52 in Fig. 2.

Figs. 7 and 8 show a modification in which the device includes a top portion 80 and a post portion 100 having a floor 220 with a post 260 depending from the center of floor 220. Post 260 is identical with post 26. The modified device can be the same as the device of the earlier figures, except as noted. Portion 80 has a generally cylindrical hole 82 axially aligned with and of a diameter marginally greater than that of the illustrated portion of post 260. Extending from the side of floor 220 opposite post 260 is a cylindrical post extension 262 which is a continuation of and the same diameter as the illustrated portion of post 260. Extension 262 passes through hole 82, the end of extension 262 remote from floor 220 being flush with the end of hole 82 remote from floor 220. Vent holes 170 in the form of opposed semi-cylindrical enlargements of hole 82 take the place of vent holes 17.

The modification has the advantage that more light gets into post 260, thus giving brighter signals.

The disclosed examples of the invention are well adapted to attain all the enumerated objects and advantages and others.

Many changes can be made without departing from the scope of the invention. Therefore the disclosed details are to be taken as illustrative only and not in a limiting sense, except as those details may be included in the claims.

What is claimed is:

1. A liquid level indicator comprising a post of light transmitting material having an observation end, a cylindrical portion adapted to be normal to said level, said cylindrical portion providing a first light path lengthwise of and in said post, a notch in one side of said post and partly defined by a polished first surface adapted for immersion in said liquid disposed at 45 degrees to said first path and terminating said first path, the depth of said notch in a direction transverse to the lengthwise dimension of said first path being substantially equal to the diameter of said cylindrical portion, said notch being further defined by a second surface disposed at more than 45 degrees to said first surface and a third surface substantially parallel to the axis of said cylindrical portion and joining said first and second surfaces where the latter are closest to each other, said post further having an end providing a fourth surface further from said observation end than said notch, said post also having a lateral extension opposite said notch and providing a second light path commencing at said first surface and perpendicular to said first path, a first signal terminating said second path, so that with said first surface not immersed in said liquid light passing along said first path will be reflected by total internal reflection at said first surface into said second path and said light will be reflected by said first signal back along said second and first paths to render said first signal visible at said observation end, and when said liquid fills said notch light passing along said first path will be transmitted substantially straight through said first surface in a continuation of said first path, and a second signal on one of said second and fourth surfaces terminating said continuation path to reflect said light back along said continuation and first paths to render said second signal visible at said observation end.

2. A liquid level indicator comprising a post of light transmitting material having an observation end, a cylindrical portion adapted to be normal to said level, said cylindrical portion providing a first light path lengthwise of and in said post, a notch in one side of said post and partly defined by a polished first surface adapted for immersion in said liquid disposed at 45 degrees to said first path and terminating said first path, the depth of said notch in a direction transverse to the lengthwise dimension of said first path being substantially equal to the diameter of said cylindrical portion, said notch being further defined by a second surface disposed at more than 45 degrees to said first surface and a third surface substantially parallel to the axis of said cylindrical portion and joining said first and second surfaces where the latter are closest to each other, said post further having an end providing a fourth surface further from said observation end than said notch, said post also having a lateral extension opposite said notch and providing a second light path commencing at said first surface and perpendicular to said first path, a first signal terminating said second path, so that with said first surface not immersed in said liquid light passing along said first path will be reflected by total internal reflection at said first surface into said second path and said light will be reflected by said first signal back along said second and first paths to render said first signal visible at said observation end, and when said liquid fills said notch light passing along said first path will be transmitted substantially straight through said first surface in a continuation of said first path, and a second signal on one of said second and fourth surfaces terminating said continuation path to reflect said light back along said continuation and first paths to render said second signal visible at said observation end, and when said liquid covers said second surface and part of said first surface part of each said signal will be visible at said observation end.

3. A liquid level indicator comprising a post of light transmitting material having an observation end, a cylindrical portion adapted to be normal to said level, said cylindrical portion providing a first light path lengthwise of and in said post, a notch in one side of said post and partly defined by a polished first surface adapted for immersion in said liquid disposed at 45 degrees to said first path and terminating said first path, the depth of said notch in a direction transverse to the lengthwise dimension of said first path being substantially equal to the diameter of said cylindrical portion, said notch being further defined by a second surface disposed at more than 45 degrees to said first surface and a third surface substantially parallel to the axis of said cylindrical portion and joining said first and second surfaces where the latter are closest to each other, said post further having an end providing a fourth surface further from said observation end than said notch, said post also having a lateral extension opposite said notch and providing a second light path commencing at said first surface and perpendicular to said first path, a first signal terminating said second path, so that with said first surface not immersed in said liquid light passing along said first path will be reflected by total internal reflection at said first surface into said second path and said light will be reflected by said first signal back along said second and first paths to render said first signal visible at said observation end, and when said liquid fills said notch light passing along said first path will be transmitted substantially straight through said first surface in a continuation of said first path, and a second signal on said fourth surface terminating said continuation path to reflect said light back along said continuation and first paths to render said second signal visible at said observation end, and when said liquid covers said second surface and part of said first surface part of each said signal will be visible at said observation end.

References Cited in the file of this patent

UNITED STATES PATENTS

| | | |
|---|---|---|
| 461,370 | Seidensticker | Oct. 13, 1891 |
| 1,724,716 | Kryzanowsky | Aug. 13, 1929 |
| 1,883,971 | Kryzanowsky | Oct. 25, 1932 |
| 2,301,460 | Sauer | Nov. 10, 1942 |

FOREIGN PATENTS

| | | |
|---|---|---|
| 801,481 | Germany | Jan. 8, 1951 |